US006483696B1

(12) United States Patent
Gan (10) Patent No.: US 6,483,696 B1
(45) Date of Patent: Nov. 19, 2002

(54) MOUNTING ASSEMBLY FOR ELECTRONIC DEVICE

(75) Inventor: Li Yuan Gan, ShenZhen (CN)

(73) Assignee: Hon Hai Precision, Ind. Co., Ltd., Taipei Hsien (TW)

( * ) Notice: Subject to any disclaimer, the term of this patent is extended or adjusted under 35 U.S.C. 154(b) by 190 days.

(21) Appl. No.: 09/715,618

(22) Filed: Nov. 17, 2000

(30) Foreign Application Priority Data

Sep. 1, 2000 (TW) .................................... 089215213 U (51) Int. Cl.[7] .............................. G06F 1/16; H05K 7/12
(52) U.S. Cl. ....................... 361/683; 361/610; 361/727; 248/220.22; 312/332.1
(58) Field of Search ................................. 361/685, 683, 361/686, 610, 724–727; 360/97.01, 98.01, 137, 137 D; 312/332.1, 333; 369/75.1–82; 16/221–392

(56) References Cited

U.S. PATENT DOCUMENTS

| 5,680,293 A | * | 10/1997 | McAnnally et al. | ........ 361/685 |
|---|---|---|---|---|
| 5,745,342 A | * | 4/1998 | Jeffries et al. | ............... 361/683 |
| 5,774,330 A | * | 6/1998 | Melton et al. | ............... 361/683 |
| 5,777,848 A | * | 7/1998 | McAnnally et al. | ........ 361/725 |
| 5,973,918 A | * | 10/1999 | Felcman et al. | ............ 361/683 |
| 5,995,364 A | * | 11/1999 | McAnnally et al. | ........ 361/685 |
| 6,229,696 B1 | * | 5/2001 | Lin et al. | ..................... 361/683 |
| 6,330,161 B1 | * | 11/2001 | Smith et al. | ................ 361/724 |
| 6,385,051 B1 | * | 5/2002 | Perez et al. | ................. 361/727 |

* cited by examiner

Primary Examiner—Lynn D. Feild
Assistant Examiner—Lisa Lea-Edmonds
(74) Attorney, Agent, or Firm—Wei Te Chung (57) ABSTRACT

A mounting assembly (1) for receiving an electronic device (100) includes a bracket (50) and a fastener (10) The fastener includes a retaining member (30), and a sliding member (20). A handle (45) is formed in the retaining member, and is movable relative to the retaining member. A pair of protrusions (47) each having an inner inclined plane (46) is formed in the handle. The sliding member has two opposite engaging portions (21, 28) and two central resiliently deformable spring connecting portions (24, 26). The spring connecting portions are deformably compressible, for allowing the engaging portions to engage with a computer enclosure. One of the spring connecting portions (24) has a pair of outer inclined planes (27) for abutting the corresponding inner inclined planes of the handle. Thus pushing the handle causes the engaging portions to engage with the computer enclosure.

19 Claims, 6 Drawing Sheets

MOUNTING ASSEMBLY FOR ELECTRONIC DEVICE

BACKGROUND

1. Field of the Invention

The present invention relates to a mounting assembly for an electronic device, and particularly to a mounting assembly for mounting a power supply in a computer enclosure.

2. Related Art

Many types of electronic equipment such as computer systems include power supplies which convert incoming alternating current to direct current. Direct current is suitable for operating various electrical components within such equipment. With constant development of electronic equipment, more and more components are being included within an electronic equipment enclosure. A power supply is generally one of the largest components in an electronic equipment enclosure. Thus the means of securing a power supply to electronic equipment significantly affects the overall configuration of the equipment.

A power supply is often directly secured to a computer enclosure by screws. This makes the process of assembly complicated and time-consuming. Furthermore, this type of securing does not allow components adjacent the power supply to be easily accessed or serviced.

As a result, hinges have been developed to secure a power supply to an enclosure, such as those disclosed in U.S. Pat. Nos. 5,172,305 and 5,745,342. The hinges allow the power supply to be pivotally moved out of its normal position, thereby allowing users to access other adjacent components. However, manufacturing of such hinges increases costs. In addition, it is awkward and troublesome to attach a power supply to an enclosure using such hinges.

SUMMARY OF THE INVENTION

Accordingly, an object of the present invention is to provide a mounting assembly for readily and securely attaching an electronic device such as a power supply to electronic equipment such as a computer enclosure.

A further object of the present invention is to provide such mounting assembly whereby components adjacent the electronic device can be easily accessed or serviced.

To achieve the above-mentioned objects, a mounting assembly of the present invention comprises a bracket and a fastener attached to the bracket. The bracket has a base, a pair of side walls extending from opposite side edges of the base, a fixing wall extending from a rear edge of the base, and a flange extending from a front edge of the base. The bracket thereby defines, a receiving space for receiving a power supply therein. The fixing wall defines a plurality of apertures. The bracket also has two posts for providing pivotal movement. The fastener comprises a retaining member fixed to the bracket, and a sliding member movably received in the retaining member. The retaining member comprises a horizontal receiving portion and a vertical actuating portion. The actuating portion forms a plurality of hooks for engaging with the apertures of the fixing wall of the bracket. A handle is formed in the actuating portion, and is movable relative to the receiving portion. A pair of protrusions, each having an inner inclined plane, is formed in the handle. The sliding member has two opposite engaging portions and two central resiliently deformable spring connecting portions. The spring connecting portions are deformably compressible, for allowing the engaging portions to engage with a computer enclosure. One of the spring connecting portions has a pair of press portions. Each press portion has an outer inclined plane, for abutting the corresponding inner inclined plane of the handle. Thus pushing of the handle causes the engaging portions to engage with the computer enclosure.

Other objects, advantages and novel features of the present invention will be drawn from the following detailed embodiment of the present invention with attached drawings, in which:

DESCRIPTION OF THE PREFERRED EMBODIMENT

Referring to FIGS. 1–4, a mounting assembly 1 of the present invention comprises a bracket 50 and a fastener 10 attached to the bracket 50. In the following description, the electronic device to be mounted by the mounting assembly 1 will be assumed to be a power supply 100. The present invention is not, however, to be construed as being limited to mounting of a power supply only. The present invention is equally applicable to mounting of other types of electronic devices. Furthermore, the apparatus to which the electronic device is mounted will be assumed to be a computer enclosure 90. The present invention is not, however, to be construed as being limited to mounting to a computer enclosure only. The present invention is equally applicable to mounting of electronic devices to other types of apparatus and electronic equipment.

Figure 1:
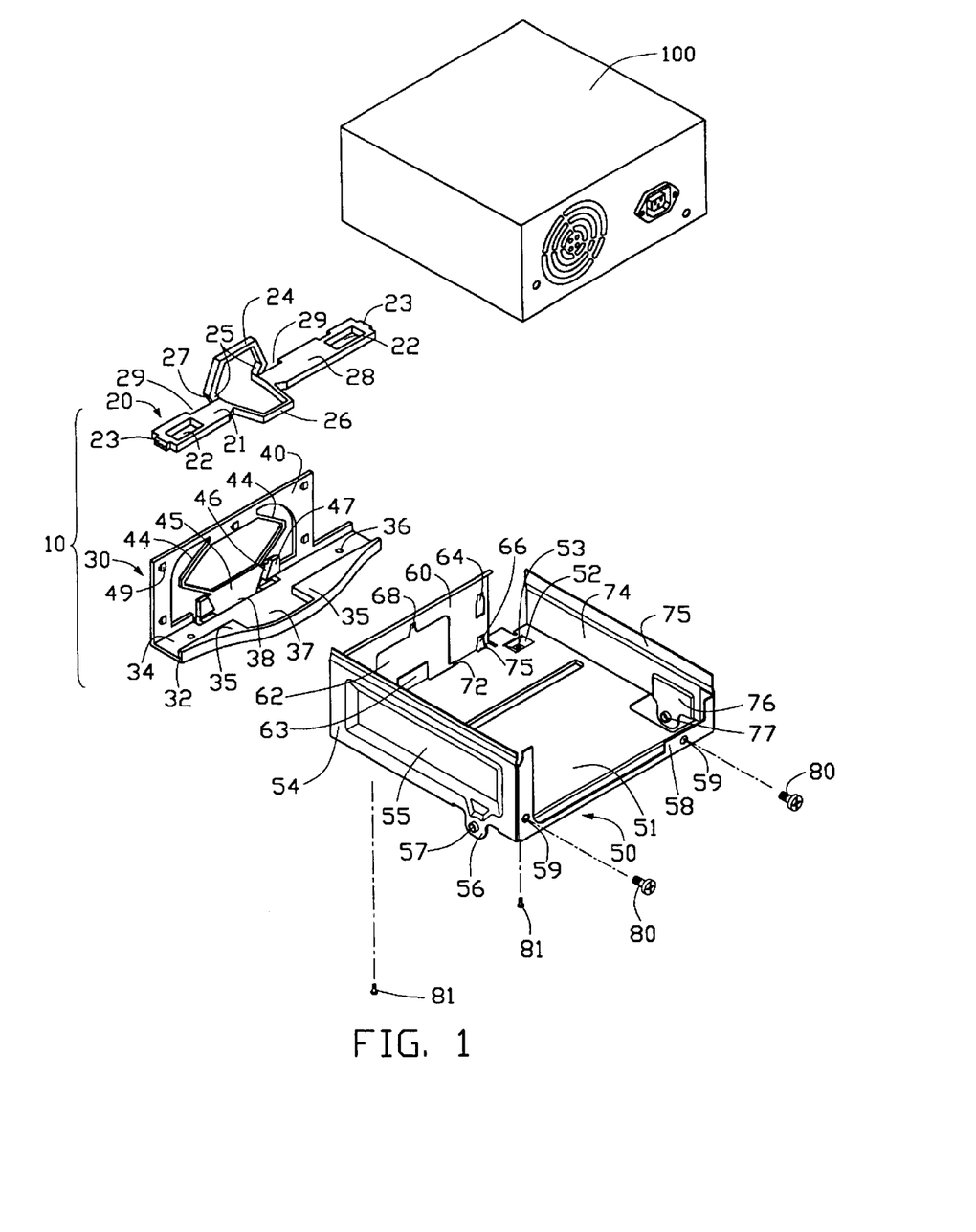
FIG. 1 is an exploded view showing a mounting assembly in accordance with the present invention, for receiving a power supply therein.

The bracket 50 of the mounting assembly 1 comprises a base 51, a first side wall 54 extending upwardly from one side edge of the base 51, a second side wall 74 extending upwardly from another side edge of the base 51 opposite the first side wall 54, a fixing wall 60 extending upwardly from a rear edge of the base 51, and a flange 58 extending upwardly from a front edge of the base 51. The bracket 50 thereby defines a receiving space (not labeled) for receiving the power supply 100 therein.

The base 51 of the bracket 50 is stamped downwardly near two corners adjacent the fixing wall 60 to form two recessed tabs 52 (only one visible). Each tab 52 defines a screw hole 53 therethrough, for receiving a corresponding screw 81 therethrough. The first side wall 54 is stamped inwardly in a center portion thereof to form a first contact wall 55, for abutting against the power supply 100. The second side wall 74 is stamped inwardly at a top portion thereof to form a second contact wall 75, for abutting against the power supply 100. First and second ears 56, 76 depend from the first and second side walls 54, 74 respectively, near the flange 58. A first post 57 projects perpendicularly outwardly from the first ear 56. A second post 77 projects perpendicularly inwardly from the second ear 76, in the same direction as the first post 57. Two slots 72 (only one visible) are defined in the base 51 adjacent the fixing wall 60, for accommodating part of the fastener 10 therein. Two slits 75 are defined in the base 51 adjacent the fixing wall 60 and near respective first and second side walls 54, 74, for facilitating engagement of the fastener 10 to the fixing wall 60.

The fixing wall 60 of the bracket 50 defines a generally U-shaped opening 62 in a central portion thereof, in communication with the slots 72 of the base 51. A portion of the fixing wall 60 bounded by the opening 62 forms a stopper tab 63. Two top apertures 64 (only one visible) are respectively defined near each of two top corners of the fixing wall 60. Two bottom apertures 66 (only one visible) are respectively defined near each of two bottom corners of the fixing wall 60, in communication with respective slits 75 of the base 51. A central aperture 68 is defined in a top central portion of the fixing wall 60, in communication with the opening 62. A pair of through holes 59 is defined in respective opposite sides of the flange 58, for receiving a pair of bolts 80 therethrough.

The fastener 10 comprises a retaining member 30 for attaching to the bracket 50, and a sliding member 20 movably received in the retaining member 30.

Figure 2:
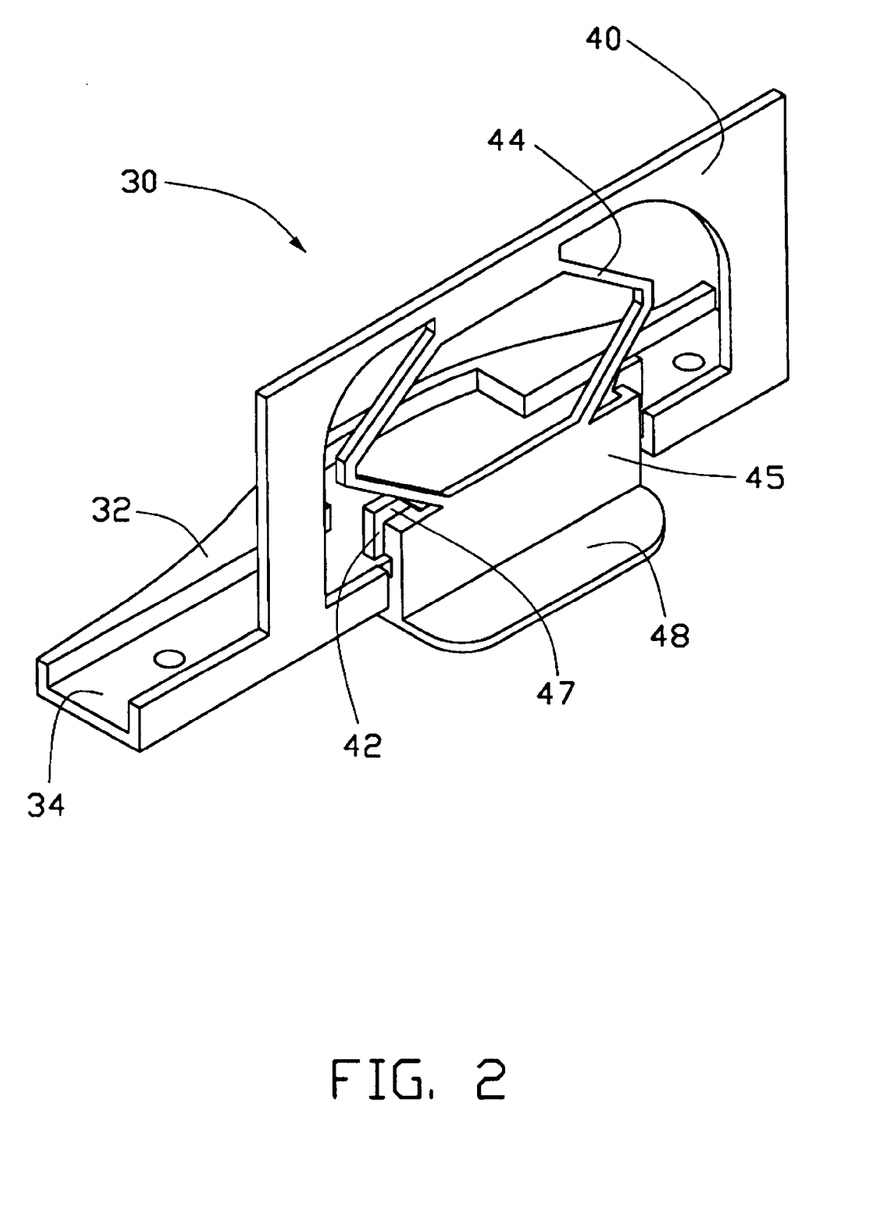
FIG. 2 is a perspective view of a retaining member of the mounting assembly of FIG. 1, but viewed from a different angle.

The retaining member 30 comprises a horizontal receiving portion 32, and a vertical actuating portion 40 extending upwardly from a longitudinal edge of the receiving portion 32. A longitudinal channel 34 is defined in a top surface of the receiving portion 32. A substantially rectangular cavity 37 is defined in a central section of the top surface of the receiving portion 32. The cavity 37 has a depth substantially identical to a depth of the channel 34, and is in communication with the channel 34. A longitudinal cutout 38 is defined through a central section of the receiving portion 32 adjacent the actuating portion 40. The cutout 38 is substantially opposite the cavity 37. A pair of fixing holes 36 is defined through opposite ends of the receiving portion 32, corresponding to the pair of screw holes 53 of the bracket 50.

The actuating portion 40 of the retaining member 30 is configured to form a pair of V-shaped resiliently deformable spring arms 44. The arms 44 extend between a top section of the actuating portion 40 and a handle 45. The handle 45 is movably accommodated in the cutout 38 of the receiving portion 32. The handle 45 comprises a pair of internal protrusions 47 on respective opposite sides thereof. Each protrusion 47 forms an inner inclined plane 46. Each protrusion 47 comprises an outer guiding portion 42, for guiding movement of the handle 45. The handle 45 also comprises a pressing tab 48 extending perpendicularly outwardly from a bottom edge thereof. The pressing tab 48 is parallel to the receiving portion 32, and is disposed lower than the receiving portion 32. Five internal hooks 49 are formed on the actuating portion 40, respectively corresponding to the apertures 64, 66, 68 of the fixing wall 60 of the bracket 50.

The sliding member 20 comprises a central vertical first spring connecting portion 24, a central horizontal second spring connecting portion 26, a horizontal first engaging portion 21, and a horizontal second engaging portion 28. The first engaging portion 21 is shorter than the second engaging portion 28. The first and second engaging portions 21, 28 extend outwardly in opposite directions from the first and second connecting portions 24, 26. The first and second engaging portions 21, 28 each form a beveled boss 23 at an outer end thereof. An opening 22 is defined in each of the first and second engaging portions 21, 28, near the boss 23. The openings 22 correspond to the fixing holes 36 of the retaining member 30, and are dimensioned to movably accommodate the recessed tabs 52 of the bracket 50. A pair of recesses 29 is defined in a side edge of each of the first and second engaging portions 21, 28 adjacent respective opposite sides of the first spring connecting portion 24, for movably accommodating the protrusions 47 of the handle 45 of the retaining member 30. The first and second spring connecting portions 24, 26 are cooperatively elastically deformable. The first spring connecting portion 24 comprises a pair of inclined press portions 25 at a lower end thereof. Each press portion 25 forms an outer inclined plane 27, corresponding to the inner inclined plane 46 of the handle 45 of the retaining member 30.

Figure 3:
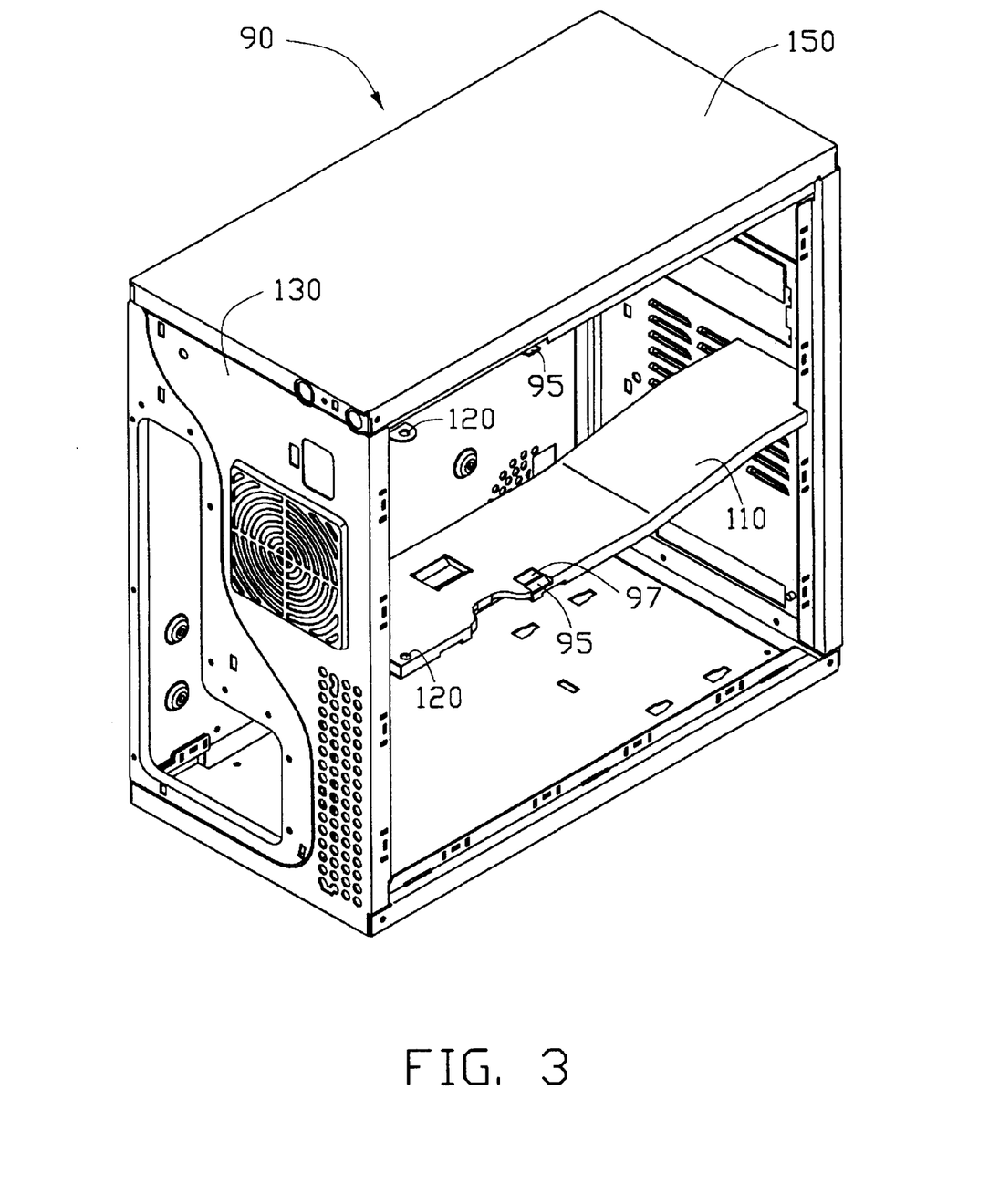
FIG. 3 is a perspective view of a computer enclosure, with one side wall removed.

Referring particularly to FIGS. 1 and 3, the power supply 100 has a pair of screw holes (not labeled) defined in a front wall (not labeled) thereof, for receiving the bolts 80. The computer enclosure 90 in which the bracket 50 is mounted comprises a bridge 110, a rear wall 130 and a top wall 150. The bridge 110 includes a guiding plate 95 at an outer side edge thereof, a retaining aperture 97 adjacent and inward from the guiding plate 95, and a pivot hole 120 near the corner of the outer side edge and the rear wall 130. The rear wall 130 defines a pivot hole 120 near a top outer corner thereof. The top wall 150 includes a guiding plate 95 at a side edge thereof, and a retaining aperture (not visible) adjacent and inward from the guiding plate 95. The retaining apertures 97 (only one visible) correspond to the bosses 23 of the fastener 10. The pivot holes 120 correspond to the first and second posts 57, 77 of the bracket 50.

Figure 4:
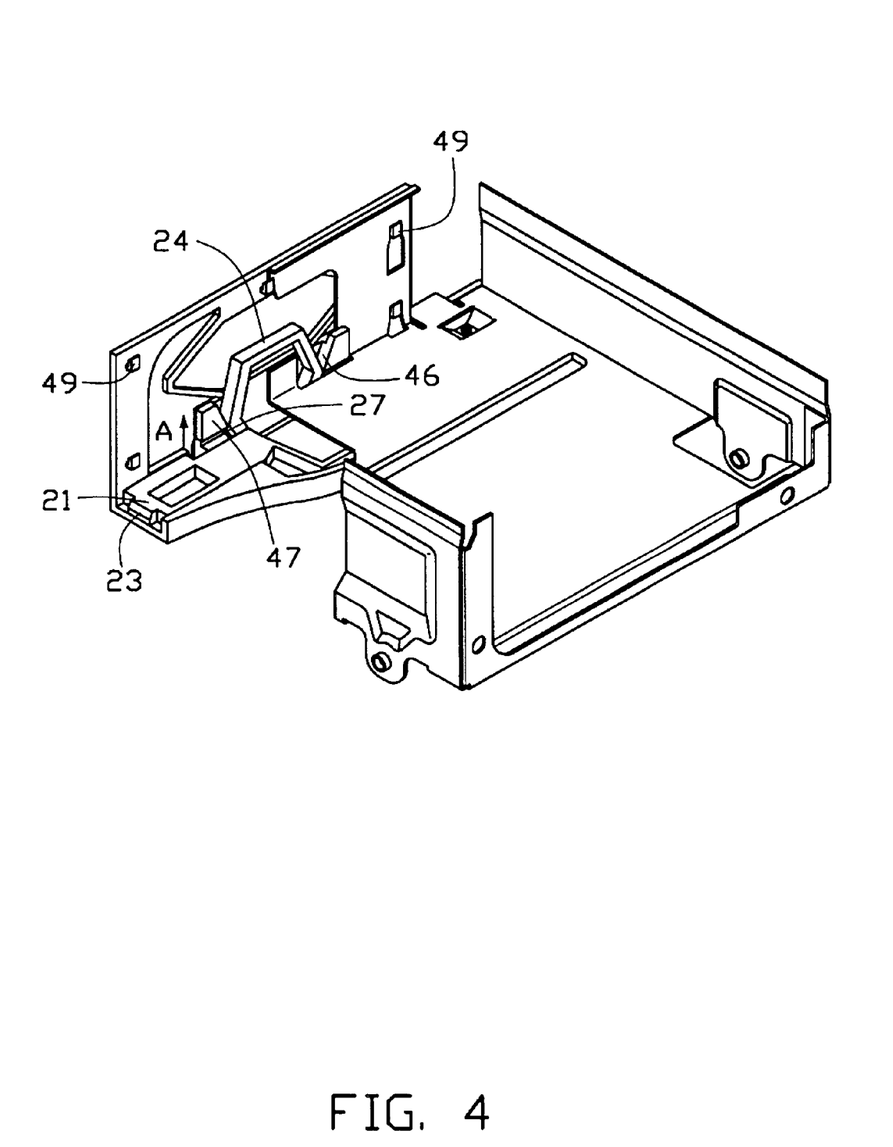
FIG. 4 is an assembled view of the mounting assembly of FIG. 1, with a portion thereof cut away.
Figure 5:
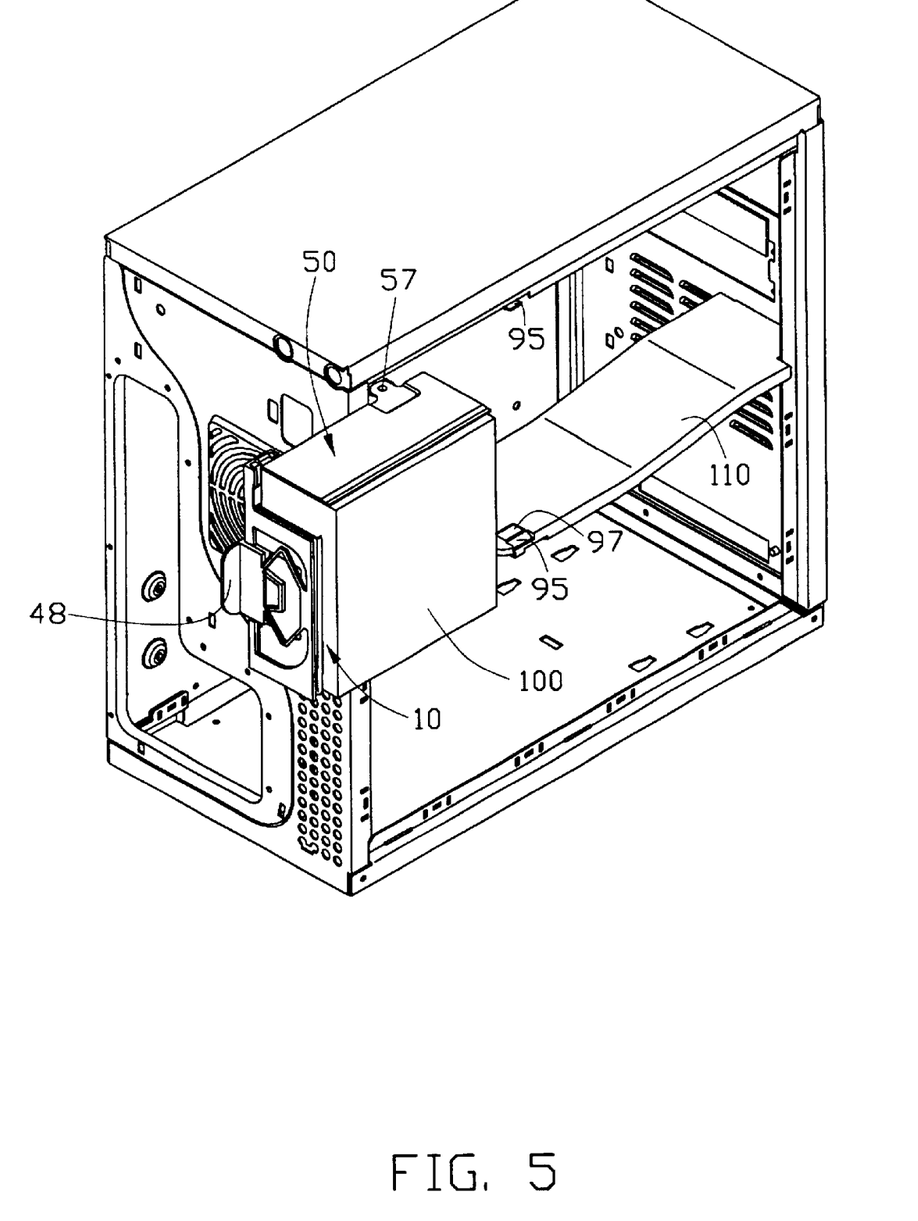
FIG. 5 is an assembled view of FIG. 1 and FIG. 3, showing the power supply mounted to the computer enclosure in a first position.
Figure 6:
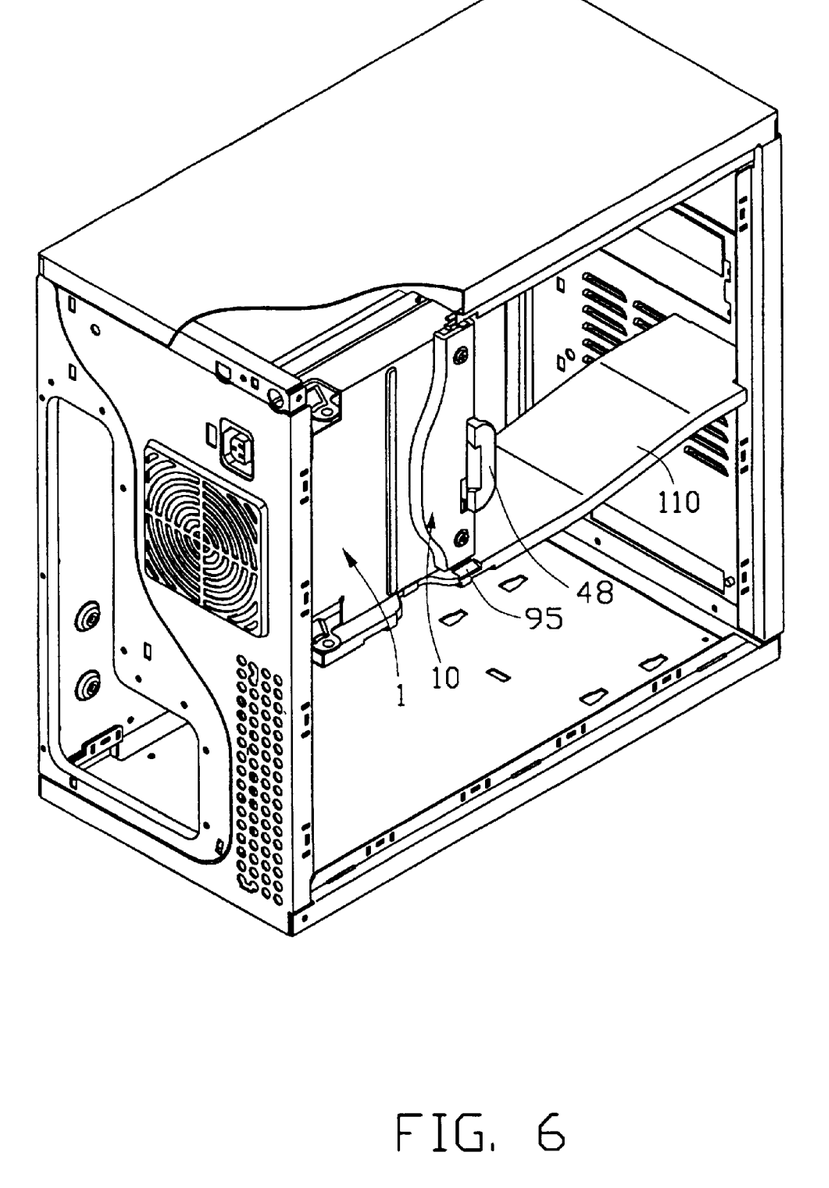
FIG. 6 is similar to FIG. 5, but showing the power supply mounted to the computer enclosure in a second position.

Referring particularly to FIGS. 1 and 4, in pre-assembly, the sliding member 20 of the fastener 10 is engaged with the retaining member 30 of the fastener 10. The first and second engaging portions 21, 28 of the sliding member 20 are received in the channel 34 of the retaining member 30. The second spring connecting portion 26 of the sliding member 20 is received in the cavity 37 of the retaining member 30. The protrusions 47 of the retaining member 30 are received in the recesses 29 of the sliding member 20. The outer inclined planes 27 of the sliding member 20 oppose the respective inner inclined planes 46 of the retaining member 30. Thus the fastener 10 is assembled as a single unit.

Then the fastener 10 is attached to the fixing wall 60 of the bracket 50. The hooks 49 of the fastener 10 respectively engage with the corresponding apertures 64, 66, 68 of the bracket 50. The fastener 10 is slid upwardly to complete engagement of the hooks 49 with the apertures 64, 66, 68. The recessed tabs 52 of the bracket 50 are movably received in the corresponding openings 22 of the fastener 10. The stopper tab 63 of the bracket 50 opposes the handle 45 of the fastener 10 and the guiding portions 42 of the protrusions 47 of the handle 45 oppose an inner surface of the fixing wall 60 of the bracket 50, thereby guiding movement of the handle 45. Finally, the screws 81 are extended through the respective fixing holes 36 and openings 22 of the fastener 10 to threadedly engage with the respective screw holes 53 of the bracket 50. Thus the fastener 10 is secured to the bracket 50 to form a single mounting assembly 1.

Referring to FIGS. 1–6, in assembly, the power supply 100 is inserted into the bracket 50. The first and second contact walls 55, 75 of the bracket 50 respectively abut opposite side walls (not labeled) of the power supply 100. The bolts 80 are extended through the respective through holes 59 of the bracket 50 to threadedly engage with the screw holes (not labeled) of the power supply 100. Then the mounting assembly 1 with a power supply 100 mounted therein is attached to the enclosure 90. The first and second posts 57, 77 of the bracket 50 engage with the corresponding pivot holes 120 of the enclosure 90. At this point, the assembly is defined to be in a first position, whereby the power supply 100 is completely outside the enclosure 90 (see FIG. 5).

Then the mounting assembly 1 is rotated about the pivot holes 120 until the bosses 23 of the fastener 10 contact the corresponding guiding plates 95 of the enclosure 90. The pressing tab 48 of the fastener 10 is then pushed toward the enclosure 90. This causes the handle 45 of the retaining member 30 to move in direction A, as shown in FIG. 4. The inner inclined planes 46 of the handle 45 engage with the outer inclined planes 27 of the press portion 25. When the handle 45 is pushed further, the inner inclined planes 46 continue to move in direction A, thereby forcing the outer inclined planes 27 to move inwardly toward each other. In addition, the guiding plates 95 of the enclosure 90 simultaneously push the bosses 23 of the fastener 10 inwardly toward each other. The said movement of the outer inclined planes 27 in cooperation with the said pushing of the bosses 23 cause the first and second spring connecting portions 24, 26 to be elastically compressed inwardly. This allows the bosses 23 to pass along the guiding plates 95 until the bosses 23 snap into the respective retaining apertures 97 (only one visible) of the enclosure 90. At this point, the assembly is defined to be in a second position, whereby the power supply 100 is securely installed within the enclosure 90 (see FIG. 6). Thus the mounting assembly 1 easily secures the power supply 100 to the enclosure 90.

To detach the mounting assembly 1 from the enclosure 90, the pressing tab 48 of the fastener 10 is pushed toward the enclosure 90. As explained in the above paragraph, this causes the first and second spring connecting portions 24, 26 to be elastically compressed. The pressing tab 48 is so pushed until the bosses 23 of the fastener 10 disengage from the retaining apertures 95 of the enclosure 90. The mounting assembly 1 is then rotated about the pivot holes 120 from the second position to the first position. Thereupon the mounting assembly 1 is easily detached from the enclosure 90.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A mounting assembly for mounting an electronic device to an electronic equipment comprising:
   a bracket having a base, a pair of side walls extending from respective opposite side edges of the base, a fixing wall extending from a rear edge of the base, and a flange extending from a front edge of the base, thereby defining a receiving space adapted to receive the electronic device, the side walls being adapted to be pivotally mounted to the electronic equipment such that the bracket is moveable between a first position and a second position; and
   a fastener attached to the bracket, the fastener comprising a retaining member fixed to the bracket and a sliding member movably received in the retaining member, the sliding member being adapted to deform and engage with the electronic equipment thereby securing the bracket in the second position.

2. The mounting assembly as described in claim 1, wherein in the first position the electronic device is completely outside the electronic equipment, and in the second position the electronic device is securely installed in the electronic equipment.

3. The mounting assembly as described in claim 1, wherein the retaining member of the fastener comprises a receiving portion and an actuating portion, the receiving portion movably receiving the sliding member of the fastener, the actuating portion being connected to the receiving portion for actuating and thereby moving the sliding member.

4. The mounting assembly as described in claim 3, wherein the fixing wall of the bracket defines a plurality of apertures, and the actuating portion of the fastener forms a plurality of hooks for engaging with the apertures.

5. The mounting assembly as described in claim 3, wherein the actuating portion of the fastener comprises a handle and two elastically deformable spring arms connected to the handle.

6. The mounting assembly as described in claim 5, wherein the sliding member of the fastener comprises at least an engaging portion and an elastically deformable spring connecting portion, and wherein the spring connecting portion is elastically compressible to allow engagement of the at least engaging portion with the electronic equipment and to allow disengagement of the at least engaging portion from the electronic equipment.

7. The mounting assembly as described in claim 6, wherein the handle of the fastener comprises at least a protrusion, each protrusion forming an inclined plane, and wherein the spring connecting portion of the fastener comprises at least a press portion, each press portion forming an inclined plane for abutting the at least an inclined plane of the handle, wherein the said inclined planes cooperate to allow engagement of the at least engaging portion of the fastener with the electronic equipment and to allow disengagement of the at least engaging portion from the electronic equipment.

8. The mounting assembly as described in claim 7, wherein the fixing wall of the bracket comprises at least a stopper tab, each protrusion of the handle comprises at least a guiding portion, for guiding movement of the handle.

9. The mounting assembly as described in claim 6, wherein the sliding member of the fastener further comprises another elastically deformable spring connecting portion and wherein such spring connecting portion is elastically compressible to facilitate engagement of the at least engaging portion of the fastener with the electronic equipment and to facilitate disengagement of the at least engaging portion from the electronic equipment.

10. The mounting assembly as described in claim 6, wherein each engaging portion forms a boss adapted for engaging with the computer enclosure.

11. The mounting assembly as described in claim 1, wherein the base of the bracket defines at least a screw hole, and the retaining member of the fastener defines at least a corresponding fixing hole, whereby at least a screw is extended through the at least a fixing hole for engagement with the at least a screw hole.

12. The mounting assembly as described in claim 11, wherein the base of the bracket forms at least a recessed tab in which the at least a screw hole is defined, and the sliding member defines at least a corresponding opening for receiving the at least a recessed tab.

13. The mounting assembly as described in claim 1, wherein the flange of the bracket defines at least a through hole, for extension of at least a bolt therethrough for engagement with the electronic device.

14. An electronic equipment assembly comprising:

electronic equipment comprising a top panel and a bridge; and a mounting assembly adapted to receive an electronic device, the mounting assembly comprising a bracket and a fastener attached to the bracket, the bracket being pivotally secured between the top panel and the bridge of the electronic equipment for movement between a first position in which the electronic device is outside the enclosure and a second position in which the electronic device is securely installed in the enclosure, the fastener having two engaging portions movable relative to each other for engaging with the top panel and the bridge thereby securing the bracket at the second position.

15. The electronic equipment assembly as described in claim 14, wherein the fastener comprises a retaining member and a sliding member movably received in the retaining member, and wherein the two engaging portions are formed at respective opposite ends of the sliding member.

16. The electronic equipment assembly as described in claim 15, wherein the retaining member of the fastener comprises a receiving portion and an actuating portion, the receiving portion movably receiving the sliding member, the actuating portion being connected to the receiving portion for actuating the sliding member and thereby moving the engaging portions toward each other.

17. A mounting assembly comprising:

a bracket receiving an electronic device therein and pivotably mounted to an electronic equipment;

a fastener attached to an underside of the bracket opposite to said electronic device, said fastener including a retaining member and a sliding member sandwiched between said retaining member and said bracket, said sliding member defining means for latchable engagement with the electronic equipment; wherein said retaining member includes a handle actuating the sliding member to be disengaged from the electronic equipment so as to release the bracket and the associated electronic device therefrom.

18. The mounting assembly as described in claim 17, wherein said handle is moved in a first direction, while said sliding member is moved in a second direction perpendicular to said first direction.

19. The mounting assembly as described in claim 18, wherein said bracket is pivotal about an axis, and said first direction is perpendicular to said axis while said second direction is parallel to said axis.

* * * * *